(12) United States Patent
Plantà Torralba et al.

(10) Patent No.: US 8,328,548 B2
(45) Date of Patent: Dec. 11, 2012

(54) ULTRASONIC DEVICE FOR MOULDING MICRO PLASTIC PARTS

(75) Inventors: Francisco Javier Plantà Torralba, Teià (ES); Encarnación Escudero Martínez, Barcelona (ES); Andrés Sancho Descalzo, Sant Cugat del Vallés (ES); Pedro Luis Macías López, Cerdanyola del Vallés (ES); José Fernando Bas Ferrero, Cerdanyola del Vallés (ES); Ma Eugenia Rodriguez Sierra, Cerdanyola del Vallés (ES); Francesco Puliga, Cerdanyola del Vallés (ES)

(73) Assignee: Fundacio Privada Ascamm, Cerdanyola del Valles (Barcelona) (ES)

( * ) Notice: Subject to any disclaimer, the term of this patent is extended or adjusted under 35 U.S.C. 154(b) by 435 days.

(21) Appl. No.: 12/672,732

(22) PCT Filed: Aug. 8, 2008

(86) PCT No.: PCT/ES2008/000562
§ 371 (c)(1), (2), (4) Date: May 19, 2010

(87) PCT Pub. No.: WO2009/027569
PCT Pub. Date: Mar. 5, 2009

(65) Prior Publication Data
US 2010/0272843 A1    Oct. 28, 2010

(30) Foreign Application Priority Data
Aug. 9, 2007 (ES) .................................. 200702245

(51) Int. Cl.
B29C 45/56 (2006.01)

(52) U.S. Cl. .................................... 425/174.2; 264/442
(58) Field of Classification Search .............. 425/174.2, 425/174.6; 264/442, 443, 478
See application file for complete search history.

(56) References Cited

U.S. PATENT DOCUMENTS 4,509,360 A * 4/1985 Erwin et al. ................. 73/61.75
(Continued)

FOREIGN PATENT DOCUMENTS
DE    202 15 458 U 1    1/2003
(Continued)

OTHER PUBLICATIONS

Michaeli et al., "New plastification concepts for micro injection moulding," Microsystem Technologies 8 (2002) 55-57 © Springer-Verlag 2002.

(Continued)

*Primary Examiner* — Yogendra Gupta
*Assistant Examiner* — Emmanuel S Luk
(74) *Attorney, Agent, or Firm* — RatnerPrestia

(57) ABSTRACT

The invention relates to an ultrasonic device for molding micro plastic parts, which combines: a) a mold cavity configured in a mold having an inlet for supplying plastic material to a chamber with an access opening and the chamber facing the cavity at a distal end in relation to its access opening; b) a cantilevered ultrasonic vibration element associated with an ultrasound generator, with an end portion or tip inserted tightly into the chamber through the access opening in an axially centered manner; c) a movement device for generating a relative movement between the end portion and the parts of the mold so that the end portion engages with the supplied plastic material and exerts a pressure of pre-determined magnitude thereon upon activation of the ultrasonic vibration element.

16 Claims, 4 Drawing Sheets

U.S. PATENT DOCUMENTS

| | | | |
|---|---|---|---|
| 4,559,810 A * | 12/1985 | Hinrichs et al. | 73/54.41 |
| 4,606,786 A * | 8/1986 | Andersson | 156/580.1 |
| 4,678,420 A * | 7/1987 | Inoue | 425/144 |
| 5,433,112 A * | 7/1995 | Piche et al. | 73/597 |
| 5,658,600 A * | 8/1997 | Okada et al. | 425/192 R |
| 5,951,163 A * | 9/1999 | Jen et al. | 374/119 |
| 6,190,601 B1 * | 2/2001 | Nakamura | 264/443 |
| 6,203,747 B1 | 3/2001 | Grunitz | |
| 6,296,385 B1 * | 10/2001 | Balasubramaniam et al. | 374/119 |
| 6,361,733 B1 | 3/2002 | Eicher et al. | |
| 6,446,494 B2 * | 9/2002 | Hastings et al. | 73/54.41 |
| 6,828,371 B2 * | 12/2004 | Lee et al. | 524/445 |
| 7,685,861 B2 * | 3/2010 | Lynch et al. | 73/1.86 |
| 8,105,065 B2 * | 1/2012 | Sikora et al. | 425/143 |
| 2002/0060379 A1 * | 5/2002 | Wei et al. | 264/443 |
| 2003/0201581 A1 * | 10/2003 | Weber et al. | 264/444 |
| 2010/0327470 A1 * | 12/2010 | Protte et al. | 264/1.24 |

FOREIGN PATENT DOCUMENTS

| | | |
|---|---|---|
| EP | 0 528 664 A1 | 2/1993 |
| EP | 0 930 144 A2 | 7/1999 |
| JP | 9-254219 A | 9/1997 |

OTHER PUBLICATIONS

International Search Report for PCT International Application No. PCT/ES2008/000562 mailed Dec. 22, 2008.

* cited by examiner

ULTRASONIC DEVICE FOR MOULDING MICRO PLASTIC PARTS

This application is a U.S. National Phase Application of PCT International Application No. PCT/ES2008/000562, filed Aug. 8, 2008.

FIELD OF THE INVENTION

The present invention generally relates to a device for manufacturing micro parts by means of molding, which uses ultrasonic vibration as a source of energy for melting and injecting the plastic, at the same time of accessing or filling the mold cavity or cavities with the molten plastic. The plastic is supplied to the device continuously in the form of a thread or strip, or discontinuously by means of granules or microgranules.

In the present specification, micro part will be understood as a plastic part having a weight less than 1 gram and generally having a range of weights comprised between thousandths of a gram to 1 gram or parts having a greater weight with defined microstructural details.

The present invention belongs to the chemical industry sector, specifically the field of transforming plastics by molding.

BACKGROUND OF THE INVENTION

There is an entire market today which requires parts with weights less than 1 g or with greater weights with microstructural details. The electrical engineering, medical, telecommunications, automotive, biotechnological and aerospace markets etc. are developing new applications involving the manufacture of parts with very small dimensions due to the generalized trend towards miniaturizing products.

Some devices are known in the state of the art which use ultrasound to make it easier to expel parts from the mold, as well as to maintain a process temperature in the mold, even to homogenize the mass previously melted by the conventional system of resistors in the nozzle of the plasticizer. The conventional system consists of an assembly of heating resistors, placed in the plasticizing cylinder which is responsible for heating and melting the thermoplastic.

In most cases, microinjection machines on the market are simply an escalation of large conventional injection machines.

Patent EP-A-0930144 with its equivalent U.S. Pat. No. 6,203,747 describes an injection machine aided by ultrasound and the method for using it. Said machine includes an injection cylinder, a typical material conveyance unit, a screw, a piston, and a vibration element connected to said cylinder to produce relative movement between the cylinder and said material conveyance unit. In this invention, the material to be melted is introduced in the cylinder, where it is melted, and is subsequently homogenized by the action of the vibrations.

The mentioned patent does not describe the use of ultrasound to cause the thermoplastic material to completely melt for the injection almost instantaneously, but rather the plastic is previously melted by means of other methods, such as by means of a thermal element, for example, in the case of the analyzed patent, and the ultrasound is applied to mitigate or correct the lack of homogeneity caused by the long time elapsing in said melting process.

Microinjection machines known on the market generally heat the thermoplastic material supplied in the form of granules or microgranules inside a plasticizing cylinder in which, upon the rotation of a screw, the material is cyclically metered discontinuously and conveyed and melted in order to inject it directly into the mold. Another microinjection system assembles an independent extrusion screw which melts the plastic and passes it to a second chamber to be injected into the mold by means of a piston.

In both cases, and especially when dealing with micro parts, due to the little injection volume to be made in each piston stroke, there is a serious problem for the polymer if the dwell time of the molten granules inside the plasticizer exceeds their residence capacity in this medium, which is the cause of the molecular degradation of the plastic and of the subsequent reduction of quality and loss in the mechanical characterization of the injected parts, which is aggravated when a larger injectable volume is available in the machines.

W. Michaeli, A. Spennemann, R. Gatner (2002), New plastification concepts for micro injection molding, Microsystem Technologies 8, 55-57, Springer-Verlag 2002, describes a proposal for plasticizing micro parts by ultrasound and it describes a testing unit. This reference indicates that different parameters of the machine were measured by means of this unit, parameters such as performance of the ultrasound generator, extent and course of the sonotrode, activation power, etc. However, this document does not indicate particular constructive details or details relating to the manner of assembling the sonotrode, and it even raises questions as to assessing how ultrasonic plasticization can be integrated in current injection molding machines.

BRIEF DESCRIPTION OF THE INVENTION

Accordingly and based on the aforementioned, it seems necessary to offer an alternative to the state of the art which allows the injected plastic to not degrade on a molecular level, nor does it reduce its quality or entail the need to correct lack of homogeneity caused by the exposure time in the melting step.

The present invention provides for such purpose a device for the molding micro plastic parts based on the controlled melting of the plastic material by ultrasound. The device has particularly been developed to be adapted to any type of pre-existing conventional injection machine or press having smaller dimensions. This device is furthermore the basis for the development of a new micro part molding machine concept.

The present invention generally relates to an ultrasonic device which allows turning a small conventional plastic injection machine or press into a machine which melts the plastic almost immediately and extremely homogeneously, thus improving the current state of the art.

The ultrasonic device proposed uses innovative structural and functional concepts for molding micro plastic parts which allow doing away with a specific microinjection machine, as well as its traditional plasticizer. The device of this invention can furthermore do away with the classic granule format of the thermoplastic material to be supplied in its place by means of continuously supplied plastic thread or any other format that can be wound on a reel.

The device of the invention is prepared to be assembled in the mold-carrying plates of any small press without needing the machine to be intended for injecting micro parts.

The ultrasonic device for molding micro plastic parts of the invention comprises combining:
 a) a mold cavity configured in a mold having an inlet for supplying plastic material to a chamber having an access opening and said chamber facing the cavity at a distal end in relation to its opening;

b) a sonotrode associated with an ultrasound generator, which acts as a plasticizing unit and is supported in cantilevered manner and with an end portion or tip by way of a piston inserted tightly (with little clearance allowing the vibration of the sonotrode and preventing the melted plastic from coming out of the chamber) into the chamber through its access opening in an axially centered manner;

c) movement means for generating a relative movement between the end portion of the sonotrode and the mold so that said end portion or tip engages with the supplied plastic material and exerts a pressure of pre-determined magnitude thereon upon activation of said ultrasonic vibration element.

According to the invention, said inlet for supplying plastic material is a side access to the chamber which comes out into a point spaced from the access opening.

In a preferred embodiment, the mentioned molding cavity or cavities is/are formed between a first part mobile along a double forward and backward linear path, and a second part of a mold, this second part being associated, by means of a series of springs and guides, with a plate fixed to the injection machine, and the mentioned chamber housing the tip of the sonotrode being configured in this second part.

The sonotrode is furthermore connected to a part in the form of ball joint which allows a pivoting movement and aids in the auto-centering of the tip of the sonotrode inside the chamber facing the mold cavity.

According to the principles of the invention, at the time of the final closure, the mold, upon moving a controlled path, applies pressure on the sonotrode, exerting great pressure on the plastic material, the ultrasound acting at the same time, almost immediately melting the plastic in an extremely homogenous manner.

The rate of injection of the plastic into the mold depends, among other known factors such as the viscosity of the plastic material used, the size of the runner and the inlet diameter, on the rate and pressure in the last step of closing the mold and on the effect of the vibration.

The ultrasonic device for molding of the invention acts very quickly. The plastic material is pre-compressed, melted and injected at virtually the same time it accesses the small cavities of the mold, preventing its solidification during its travel. Molding is thereby made easier and the quality of the parts is optimized since the shear exerted on a plastic material during conventional plasticization is prevented and all the problems deriving from the dwell time of the material in the plasticizer from its entrance until the material becomes a part are eliminated.

BRIEF DESCRIPTION OF THE DRAWINGS

The foregoing and other advantages and features will be better understood from the following description of the attached drawings showing the proposed ultrasonic device for molding micro parts.

In said drawings.

DETAILED DESCRIPTION OF AN EMBODIMENT

The present invention provides an ultrasonic device for molding micro parts using structural and functional concepts for molding plastics which allow simplifying both the structure of the installation and the process and maintenance thereof.

Figure 1:
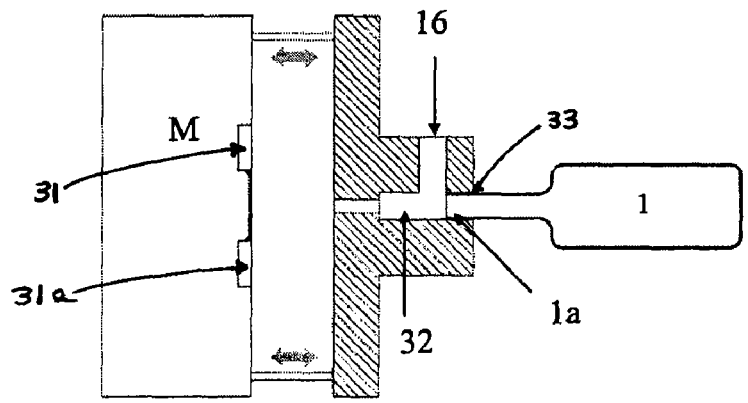
FIGS. 1 to 3 are schematic views to illustrate the principles of this invention.

FIG. 1 shows the device for molding micro parts with the mold M open. This is the situation prior to the melting of the plastic material, in which the imprints and/or the mold can be switched at will depending on the type of part to be manufactured. The device is located in a position in which the inlet of the cavities 31, 31a of the mold M are not connected to the outlet of the chamber 32, having the tip 1a of the sonotrode inserted. This figure shows a mold M with two mold cavities 31, 31a intended for forming two parts, the number of parts added to the mold M being variable; a chamber 32 separated a certain distance from the mold M and an ultrasonic vibration element or sonotrode 1 known in and of itself. This is the situation prior to the melting in which the imprints and/or the mold M can be switched at will depending on the type of part to be manufactured.

Figure 2:
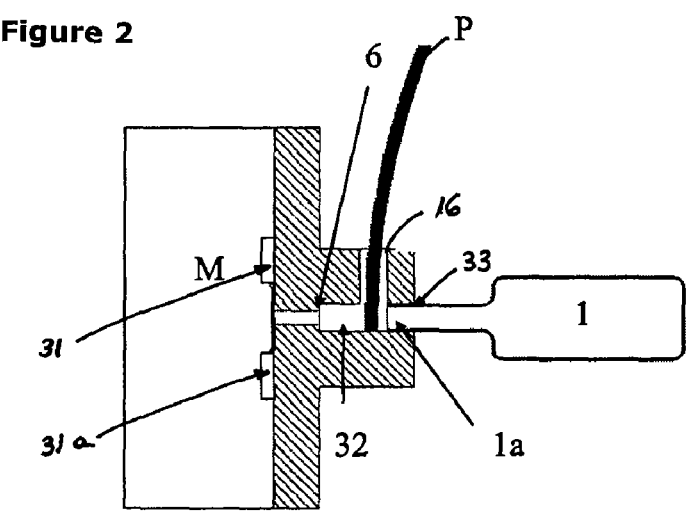

FIG. 2 shows the device for the injection of micro parts in the closed position of the mold M and the plastic material supply position. The device is in a second position in which communication does exist between the cavities 31, 31a, the mold M and the chamber 32. FIG. 2 therefore also shows how the mold M is in direct contact with the chamber 32. It is also observed that said chamber 32 has two inlets and an outlet. The plastic material P will be supplied continuously with a thread or strip, or discontinuously by means of granules, through one of these inlets.

Figure 3:
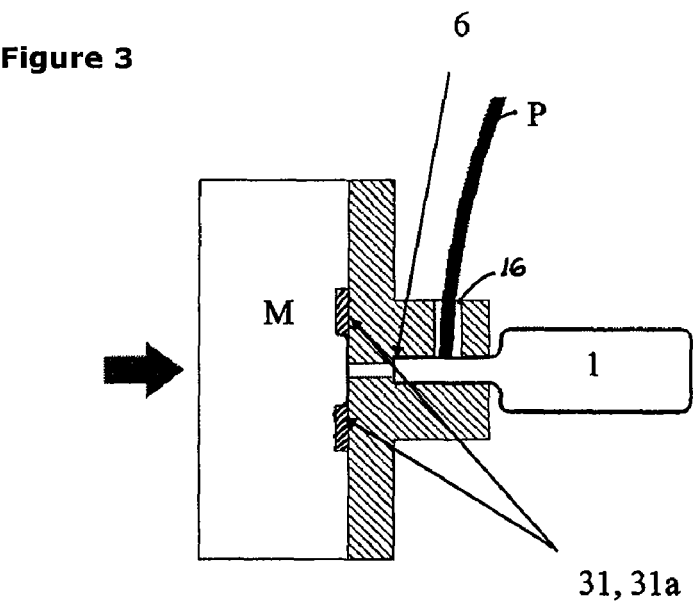

FIG. 3 shows the device for the injection of micro parts in the melting, or plasticization, and injection position. The device is in a third position in which communication does exist between the mold M and the chamber 32, and the mold M is furthermore pressed against the sonotrode 1. In this situation, the plastic material P will melt due to the combined and simultaneous effects of the pressure of the mold M and the action of the ultrasound.

The mentioned FIG. 2 clearly shows the inlet 16 through which the plastic material will be supplied either continuously with a thread or strip, or discontinuously by means of granules. The figure shows a chamber 32 with an access opening 33 comprising a guide configuration which is suitable for allowing the movement of the chamber 32, and with it the mold M, towards the sonotrode 1 when it is in said second position, said guide configuration comprising at least said access opening 33. Said chamber 32 comprises a stop configuration, opposite said opening 33 and in communication with said outlet, said stop configuration being suitable for regulating compression with an end of said piston-shaped end portion 1a of the sonotrode and thus stopping the movement of the chamber 32 towards the sonotrode 1.

The vibration element or sonotrode 1 has a piston-shaped end 1a which is suitable for pressing the plastic from said chamber 32 towards the inside of the mold M through the outlet of the chamber 32 to produce said microinjection.

The device of the present invention is characterized in that it is associated with a control system suitable for controlling the operation of the sonotrode 1 and the movement of the chamber 32 towards the sonotrode 1 through corresponding drive means. Said control system is suited so that the sonotrode 1 works simultaneously to the movement of the chamber 32 to cause the plastic P to melt substantially immediately.

With reference to the drawings, the proposed ultrasonic device for the injection of micro plastic parts comprises combining:

a) at least one mold cavity 31 configured in a mold M having an inlet 16 for supplying plastic material to a chamber 32 with an access opening 33 facing the cavity 31 at a distal end in relation to its opening, said inlet 16 forming a side access to the chamber 32 which comes out into a point spaced from the access opening 33;

b) an ultrasonic vibration element 1 which acts as a plasticizing unit and comprises a cantilevered sonotrode associated with an ultrasound generator, with an end portion 1a or tip inserted tightly (with minimal allowance) into the cavity 31 through its access opening in an axially centered manner;

c) movement means for generating a relative movement between the end portion 1a and said parts of the mold M so that said portion 1a engages with the supplied plastic material P and exerts a pressure of pre-determined magnitude thereon upon activation of said ultrasonic vibration element.

Figure 4:
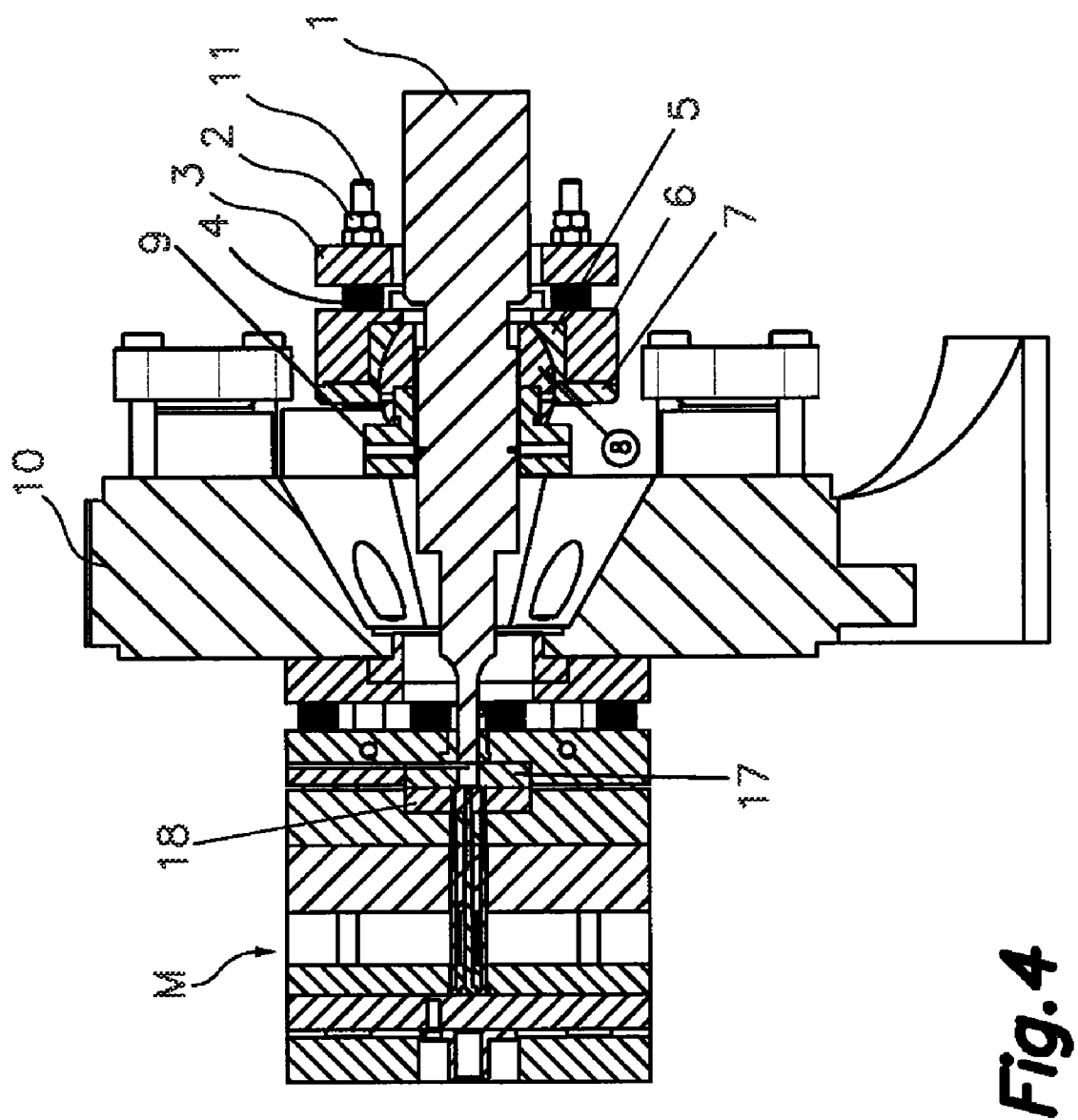
FIG. 4 is a sectioned elevational view showing an embodiment of the proposed ultrasonic device for molding.

As seen in FIG. 4, the mentioned mold cavity 31 is formed between a first part 18 mobile along a double forward and backward linear path, and a second part 17 of a mold M, this second part 17 being associated, by means of a series of springs and guides, with a plate 10 fixed to the injection machine or press, and the mentioned chamber 32 being configured in this second part.

Figure 5:
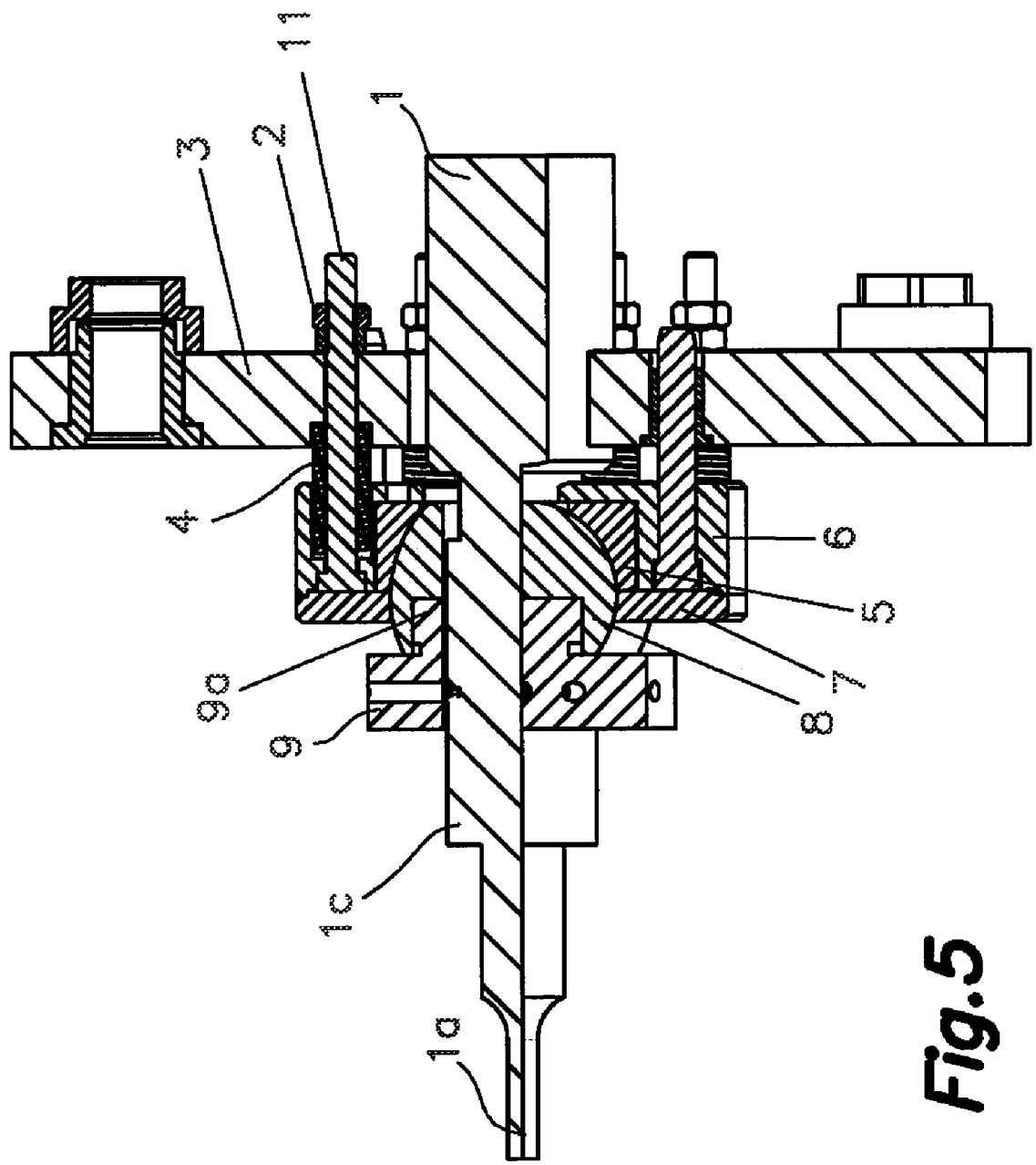
FIG. 5 is an enlarged partially sectioned elevational view showing the portion for securing the sonotrode.

As can be seen in FIGS. 4 and 5, the sonotrode 1 is supported by an annular support 9 coaxially coupled thereon and rigidly fixed on a contour contained in a nodal cross section 1c of said sonotrode 1, being fixed by means of a plurality of equally spaced radial screws resting at their tip on the mentioned contour of the sonotrode. The annular support 9 has an extended portion or tail 9a which is inserted and fixed inside a member with outer spherical surfaces forming a ball joint 8 which allows a pivoting movement for the assembly of the sonotrode 1 and provides auto-centering of the tip a inside the chamber 32.

FIG. 5 shows, in an enlarged view, that the mentioned ball joint 8 is surrounded by a bearing 5 which is in turn arranged inside a housing body 6 closed by a cover 7, this housing body 6 being associated with a support 3 of the sonotrode unit through guiding columns, and springs 4 loaded at a pre-established pressure, providing nuts 2 for such purpose at the ends of the corresponding screws 11 coaxial to the springs 4, compressing the support assembly 9,8,6 against the support 3.

It is also seen that the support 3 is arranged parallel to and associated with the fixed plate 10 of the injection machine by means of columns finished with regulating nuts which allow controlling the distance between support 3 and plate 10.

According to the most preferred embodiment, a first part 18 of the mold M is movable with respect to said second part 17 carrying the chamber 32 to adopt at least two positions, a first position in which the inlet to the cavity 31 or cavities of the mold M is not connected to the outlet of the chamber 32 and a second position in which said communication does exist.

A guide configuration which is suitable for allowing the movement of the chamber 32 towards the sonotrode 1 upon compression of the second part 17 of the mold M when it is in said second position has been provided in the device that is being described.

A stop configuration which is suitable for abutting with an end of said piston-shaped portion 1a of the sonotrode, and thus stopping the movement of the chamber 32 towards the sonotrode 1, is also provided.

Figure 6:
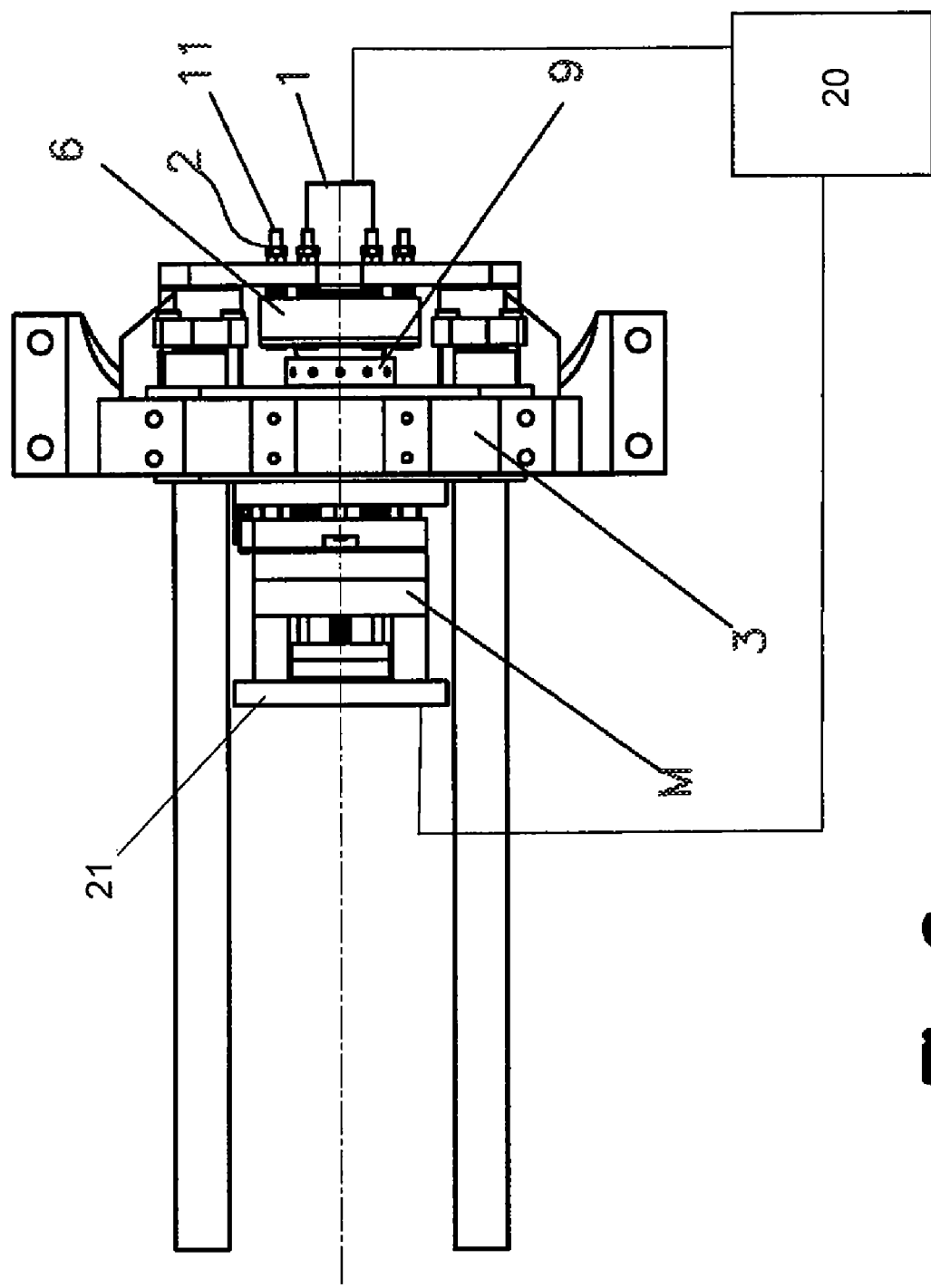
FIG. 6 is an elevational view of the described device associated with a control system.

As schematically illustrated in FIG. 6, the device is associated with a control system 20 suitable for controlling the operation of the sonotrode 1 and the movement of the chamber 32 towards the sonotrode 1 through corresponding drive means 21, for which purpose said control system 20 is connected to both, the sonotrade 1 and said drive means 21. This control system is suited so that the sonotrode 1 works simultaneously to the movement of the chamber 32 to cause the plastic to melt substantially immediately.

The device being described is suitable for automatically receiving plastic through said inlet 16 of the chamber 32, by supplying granules or microgranules in the chamber 32 or by a continuous supply of thread or profile previously obtained by extrusion, and for melting it by the action of the sonotrode 1.

As can be seen in FIG. 5, the proposed device is a complete functional unit suitable for being assembled in mold-carrying plates of an injection machine, by removing the central plasticizing unit and assembling the support bedplate of the sonotrode 1, or in a press.

A person skilled in the art could introduce changes and modifications in the described embodiments without departing from the scope of the invention as it is defined in the attached claims.

The invention claimed is:

1. An ultrasonic device for molding micro plastic parts, of the type which comprises combining:

a) at least one mold cavity configured in a mold with at least one inlet for supplying plastic material to a chamber with an access opening and said chamber facing the cavity at a distal end in relation to its access opening;

b) a cantilevered ultrasonic vibration element associated with an ultrasound generator, with an end portion or tip inserted tightly into the chamber, through its access opening in an axially centered manner;

c) movement means for generating a relative movement between the end portion and said parts of the mold so that said portion engages with the supplied plastic material and exerts a pressure of pre-determined magnitude thereon upon activation of said ultrasonic vibration element.

2. The device according to claim 1, wherein said at least one inlet is a side access to the chamber which comes out into a point spaced from the access opening.

3. The device according to claim 1, wherein said ultrasonic vibration element acts as a plasticizing unit and comprises a sonotrode.

4. The device according to claim 1, wherein the mold cavity is formed between a first part mobile along a double forward and backward linear path, and a second part of a mold, this second part being associated, by a series of springs and guides, with a plate fixed to the injection machine or press, and the mentioned chamber being configured in this second part.

5. The device according to claim 3, wherein the sonotrode is supported by an annular support coaxially coupled thereon and rigidly fixed on a contour contained in a nodal cross section of said sonotrode, being fixed by a plurality of equally spaced radial screws resting at their tip on the mentioned contour of the sonotrode, and in that the annular support has an extended portion or tail which is inserted and fixed inside a member with outer spherical surfaces forming a ball joint which allows a pivoting movement for the assembly of the sonotrode and provides auto-centering of the tip inside the chamber.

6. The device according to claim 5, wherein the ball joint is surrounded by a bearing which is in turn arranged inside a housing body closed by a cover, this housing body being associated with a support of the sonotrode unit through guiding columns and springs.

7. The device according to claim 6, wherein said springs are loaded at a pre-established pressure, providing nuts for such purpose at the ends of the corresponding screws coaxial to the springs, compressing the support assembly against the support.

8. The device according to claim 6, wherein the support is arranged parallel to and associated with the fixed plate of the injection machine or press by columns finished with regulating nuts which allow controlling the distance between support and plate.

9. The device according to claim 4, wherein said first part of the mold is movable with respect to said second part carrying the chamber to adopt at least two positions, a first position in which the inlet to the cavity or cavities of the mold is not connected to the outlet of the chamber, and a second position in which said communication does exist.

10. The device according to claim 9, wherein a guide configuration is provided which is suitable for allowing the movement of the chamber towards the sonotrode upon compression of the second part of the mold when it is in said second position.

11. The device according to claim 9, wherein a stop configuration is provided, which is suitable for abutting with an end of said end portion of the sonotrode, which has a piston shape, and thus stopping the movement of the chamber towards the sonotrode.

12. The device according to claim 3, further comprising a control system suitable for controlling the operation of the sonotrode and the movement of the chamber towards the sonotrode through corresponding drive means.

13. The device according to claim 12, wherein said control system is suited so that the sonotrode works simultaneously to the movement of the chamber to cause the plastic to melt substantially immediately.

14. The device according to claim 2, wherein the device is adapted for automatically receiving plastic through said inlet of the chamber, by supplying granules or microgranules in the chamber or by a continuous supply of thread or profile previously obtained by extrusion, and for melting it by the action of the sonotrode.

15. The device according to claim 1, wherein the device is a complete functional unit which is suitable for being assembled in mold-carrying plates of an injection machine or press.

16. The device according to claim 3, wherein the device is a complete functional unit equipped with drive means provided for carrying out the movement of the chamber towards the sonotrode or vice versa.

* * * * *